United States Patent
Payne et al.

(10) Patent No.: US 10,914,604 B2
(45) Date of Patent: Feb. 9, 2021

(54) VEHICLE SYSTEMS AND METHODS FOR CONSISTENT ROUTE PREDICTION

(71) Applicant: Toyota Motor Engineering & Manufacturing North America, Inc., Plano, TX (US)

(72) Inventors: Joshua D. Payne, Ann Arbor, MI (US); Steven Baker, Northville, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 228 days.

(21) Appl. No.: 16/126,072

(22) Filed: Sep. 10, 2018

(65) Prior Publication Data
US 2020/0080859 A1    Mar. 12, 2020

(51) Int. Cl.
*G01C 21/34* (2006.01)
*G01S 19/42* (2010.01)
*G01C 21/36* (2006.01)

(52) U.S. Cl.
CPC ..... *G01C 21/3484* (2013.01); *G01C 21/3626* (2013.01); *G01C 21/3629* (2013.01); *G01S 19/42* (2013.01)

(58) Field of Classification Search
CPC .............. B60W 30/18009; F02D 29/02; F02D 2200/501; F02D 2200/602; F02D 2200/701; F02D 2200/0625; F02N 2200/123; F02N 2300/20; F02N 2300/304; F02N 2300/2006; F02N 11/08; F02N 11/0814; F02N 11/0818; F02N 11/0825; F02N 11/0829; F02N 11/0833; F02N 11/084; F02N 11/0844
USPC .............................. 701/412, 102; 123/179.4
See application file for complete search history.

(56) References Cited

U.S. PATENT DOCUMENTS

| | | | |
|---|---|---|---|
| 6,446,002 B1 | 9/2002 | Barton | |
| 9,695,760 B2 | 7/2017 | Dufford et al. | |
| 9,702,718 B2 | 7/2017 | Payne et al. | |
| 10,094,674 B2 * | 10/2018 | Tseng | G01C 21/34 |
| 10,584,976 B2 * | 3/2020 | Kim | G01C 21/3484 |
| 2004/0093620 A1 | 5/2004 | Iino et al. | |
| 2008/0051977 A1 | 2/2008 | Tryon | |
| 2017/0120761 A1 | 5/2017 | Kapadia et al. | |

* cited by examiner

*Primary Examiner* — Dalena Tran
(74) *Attorney, Agent, or Firm* — Dinsmore & Shohl LLP

(57) ABSTRACT

A navigation system that includes a processor, a satellite antenna communicatively coupled to the processor, a memory module communicatively coupled to the processor, a route list stored in the one or more memory modules, and machine readable instructions stored in the memory module that cause the navigation system to perform at least the following when executed by the one or more processors: receive the signal from the global positioning system satellite; transform the signal into a current location of the navigation system;
track a travel route relative to the current location until conclusion of the travel route; determine whether at least one route candidate from the route list includes the travel route; and generate an inquiry to identify the travel route as a consistent route in response to determining at least one route candidate from the route list does not include the travel route.

20 Claims, 3 Drawing Sheets

VEHICLE SYSTEMS AND METHODS FOR CONSISTENT ROUTE PREDICTION

TECHNICAL FIELD

The present specification generally relates to mapping systems and methods for predicting a vehicle route of travel based on a historical database of frequently traveled routes, and, in particular, a driver initiated route prediction for tracking consistent, yet infrequent, traveled routes.

BACKGROUND

Vehicles, such as hybrid vehicles, may improve their fuel efficiency, drivability, and driver comforts by predetermining whether to use the battery or the engine to reach a driver's projected destination and the proper moments to change power train controls during the route. Many vehicles include navigation systems, such as Global Positioning Systems (GPS), that store or access digital maps having a series of preprogrammed route segments that interconnect numerous destinations together. A navigation system may include a route prediction algorithm that identifies frequently traveled routes of a driver. With this data, the navigation system may identify when the driver is traveling along a frequently traveled route again to thereby provide any of the benefits described above during that travel. In some instances, the driver may travel consistently along some routes that are not as frequent relative to those identified by the navigation system as being frequent such that the driver is inhibited from improving the fuel efficiency of the vehicle during these relatively infrequent, yet consistent travels.

Accordingly, a need exists for a system that enables selective driver identification of a consistent route for inclusion in a route prediction algorithm, thereby allowing for the improvement of the vehicle's fuel efficiency on the consistently traveled routes.

SUMMARY

In one embodiment, a vehicle comprising a navigation system, the navigation system comprising a processor; a satellite antenna communicatively coupled to the processor, wherein the satellite antenna receives a signal from a global positioning system satellite; a memory module communicatively coupled to the processor; a route list stored in the one or more memory modules; and machine readable instructions stored in the memory module that cause the navigation system to perform at least the following when executed by the one or more processors: receive the signal from the global positioning system satellite; transform the signal into a current location of the navigation system; track a travel route relative to the current location until conclusion of the travel route; determine whether at least one route candidate from the route list includes the travel route; and generate an inquiry to identify the travel route as a consistent route in response to determining at least one route candidate from the route list does not include the travel route.

In another embodiment, a method for initiating a route prediction in a navigation system for infrequently-traveled routes, the method comprising: receiving a signal at the navigation system from a GPS satellite; processing the signal into a current geographical location of the navigation system; tracking an active route relative to the current geographical location such that the navigation system continues tracking the active route until conclusion of the active route; accessing a route list stored within a memory of the navigation system upon conclusion of the active route, wherein the route list comprises a plurality of frequently-traveled routes; determining whether the route list includes the active route; and presenting a prompt to store the active route in the route list when the route list does not include the active route.

In another embodiment, a navigation system comprising: a processor; and a memory module communicatively coupled to the processor, wherein the memory module includes a plurality of frequently-traveled routes and logic instructions stored therein, wherein the plurality of frequently-traveled routes comprise location data, wherein the processor is operable to execute the logic instructions to: identify a current location of the navigation system; compare the current location to the plurality of frequently-traveled routes to determine if at least one frequently-traveled route includes location data similar to the current location; generate an inquiry to add a new frequently-traveled route to the memory module in response to the plurality of frequently-traveled routes not including location data similar to the current location; and record the new frequently-traveled route when the inquiry receives a positive input; or cease executing the logic instructions when the inquiry receives a negative input.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to navigation systems, such as those contained in vehicles, that can receive signals from a Global Positioning System (GPS) to determine the current location of the navigation system within the vehicle. The navigation system may predict a route of the vehicle based on GPS data (e.g., latitude, longitude, heading, etc.) related to the current location of the vehicle and a historical log of frequently traveled routes by the operator of the vehicle, for example, at a particular time of day. In some instances, a driver may consistently travel a certain route that is not as frequently-traveled as the routes identified by the navigation system as being frequently traveled such that a driver may desire to manually indicate to the system that the current route is to be included in future route prediction algorithms as if it were a frequently-traveled route. In other instances, a driver may travel along a new route that has not been consistently traveled but is known to be a route that will be consistently traveled in the future, such that the driver may desire to identify the route as such at the outset.

The embodiments disclosed herein will be described with reference to the terms "location," "segment," and "route." As used herein, "location" means a unique geographic coordinate defined with reference to a coordinate system, such as a geographic location defined by a particular latitude and longitude. As used herein, "segment" means an ordered series of locations, such as a series of locations between turns. As used herein, "route" means an ordered series of segments.

Figure 1:
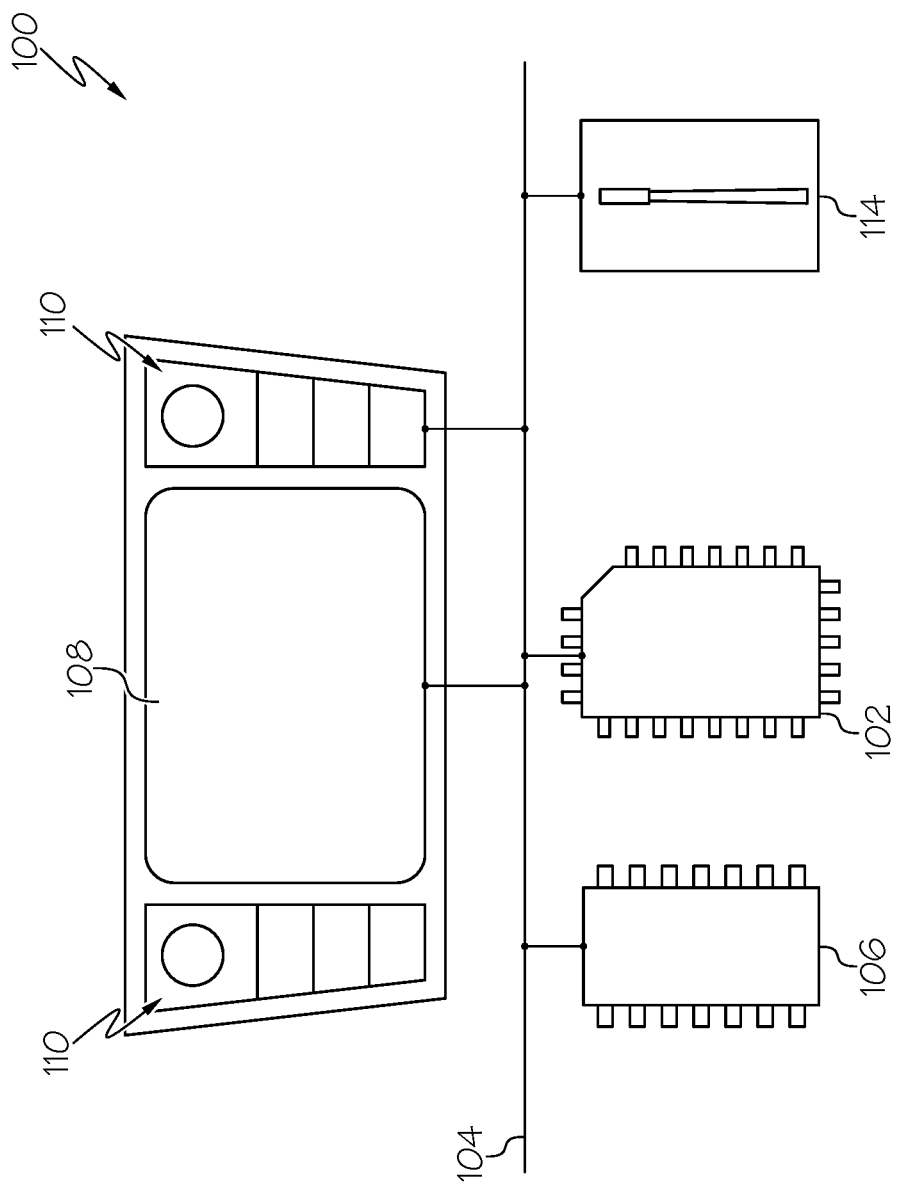
FIG. 1 schematically depicts of a navigation system, according to one or more embodiments shown and described herein.

Referring now to FIG. 1, an embodiment of a navigation system 100 is schematically depicted. It is noted that, while the navigation system 100 is depicted in isolation, the navigation system 100 can be coupled to a vehicle. The vehicle may be an automobile or any other passenger or non-passenger vehicle such as, for example, a terrestrial, aquatic, and/or airborne vehicle. The navigation system 100 may be embedded within a mobile device (e.g., smartphone, laptop computer, etc.) carried by a driver of the vehicle.

The navigation system 100 includes one or more processors 102. Each of the one or more processors 102 may be any device capable of executing machine readable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the navigation system. Accordingly, the communication path 104 may communicatively couple any number of processors with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The navigation system 100 includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a static database that includes geographical information pertaining to previously traveled segments and routes and a dynamic database that includes temporal information pertaining to when particular routes and/or segments were traveled. However, it should be understood that other embodiments may not include a static database and/or a dynamic database.

In embodiments that include a static database, the static database generally include a segment list and a route list. The segment list may include a plurality of segments. Each segment of the plurality of segments in the segment list may include a segment identifier, a segment distance, one or more "to" segments, one or more "from" segments, and a plurality of locations. The segment identifier may be a unique identifier that allows a particular segment to be distinguished from other segments. The segment distance may be representative of the total distance of the segment (e.g., the distance from the starting location of the segment to the ending location of the segment, or the sum of the distances between each pair of successive locations in the segment). The one or more "to" segments may include segment identifiers for segments that have been historically traveled immediately after the segment. The one or more "from" segments may include segment identifiers for segments that have been historically traveled immediately before the segment. Each location of the plurality of locations may include location data, such as latitude, longitude, altitude, speed, course, heading, etc. It should be understood that in other embodiments, each segment in the segment list may include more or less information than described. The route list may include a plurality of routes. Each route of the plurality of routes may include a route identifier and an ordered list of segments. The route identifier may be a unique identifier that allows a particular route to be distinguished from other routes. The ordered list of segments may include an ordered list of segment identifiers, where each segment identifier corresponds to a segment stored in the segment list of the static database.

In embodiments that include a dynamic database, the dynamic database generally includes a route history. The route history includes a plurality of route history entries. Each route history entry may include a route identifier and a route occurrence entry for each time the route was travelled. Each route occurrence entry includes a start date, a start time, a day of the week (e.g., Mon-Sun), a time of the day (e.g., AM or PM), and an ordered list of segments. The route identifier typically corresponds to a route stored in the static database. The ordered list of segments may include an ordered list of segment identifiers, where each segment identifier corresponds to a segment stored in the segment list of the static database. Each segment of the ordered list of segments may also include additional information, such as a start time, an end time, a maximum speed, a minimum speed, an average speed, etc. In some embodiments that include a static database and a dynamic database, the static database and dynamic database are stored in XML format, though it will be appreciated that the static database and dynamic database may be stored in any other format.

Navigation system 100 comprises a display 108 for providing visual output such as, for example, maps, navigation, entertainment, information, or a combination thereof. The display 108 is coupled to the communication path 104. Accordingly, the communication path 104 communicatively couples the display 108 to other modules of the navigation system 100. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 108 can include at least one of the one or more processors 102 and the one or memory modules 106. While the navigation system 100 includes a display 108 in the embodiment depicted in FIG. 1, the navigation system 100 may not include a display 108 in other embodiments, such as embodiments in which the navigation system 100 predicts a route based on turn determination and/or segment identification and automatically utilizes the predicted route to optimize a vehicle operating parameter based on the predicted route.

The depicted navigation system 100 comprises tactile input hardware 110 coupled to the communication path 104 such that the communication path 104 communicatively couples the tactile input hardware 110 to other modules of the navigation system 100. The tactile input hardware 110 may be any device capable of transforming mechanical, optical, or electrical signals into a data signal capable of being transmitted with the communication path 104. Specifically, the tactile input hardware 110 may include any number of movable objects that each transform physical motion into a data signal that can be transmitted to over the communication path 104 such as, for example, a button, a switch, a knob, a microphone or the like. In some embodiments, the display 108 and the tactile input hardware 110 are combined as a single module and operate as an audio head unit or an infotainment system. However, it is noted, that the display 108 and the tactile input hardware 110 may be separate from one another and operate as a single module by exchanging signals via the communication path 104. While the navigation system 100 includes tactile input hardware 110 in the embodiment depicted in FIG. 1, the navigation system 100 may not include tactile input hardware 110 in other embodiments, such as embodiments that do not include a display 108.

The navigation system 100 comprises a satellite antenna 114 coupled to the communication path 104 such that the communication path 104 communicatively couples the satellite antenna 114 to other modules of the navigation system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106.

The navigation system 100 can be formed from a plurality of modular units, i.e., the display 108, tactile input hardware 110 and satellite antenna 114, can be formed as modules that when communicatively coupled form the navigation system 100. Accordingly, in some embodiments, each of the modules can include at least one of the one or more processors 102 and/or the one or more memory modules 106. Accordingly, it is noted that, while specific modules may be described herein as including a processor and/or a memory module, the embodiments described herein can be implemented with the processors and memory modules distributed throughout various communicatively coupled modules.

In embodiments where the navigation system 100 is coupled to a vehicle, the one or more processors 102 execute machine readable instructions to transform the global positioning satellite signals received by the satellite antenna 114 into data indicative of the current location of the vehicle.

Figure 2:
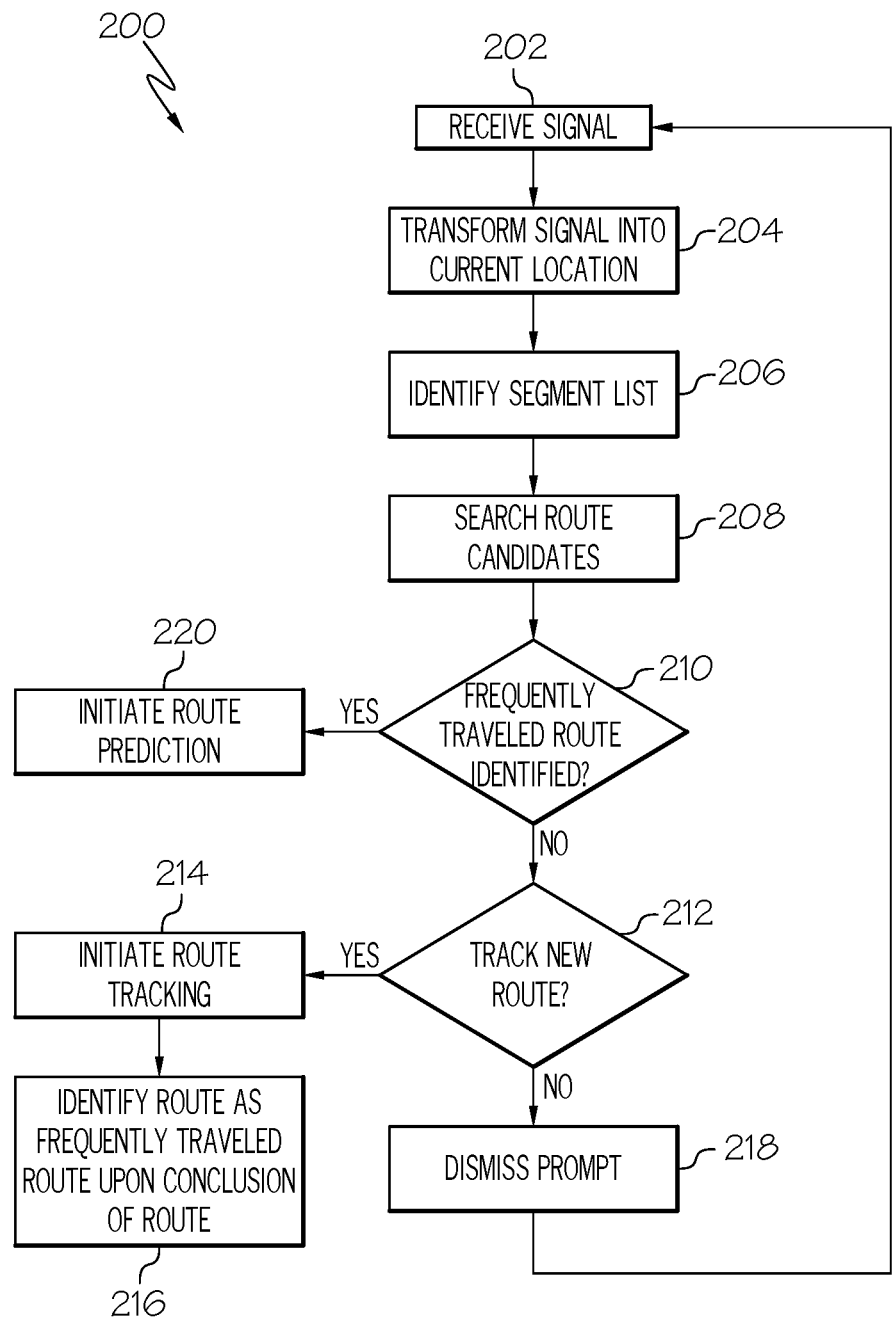
FIG. 2 schematically depicts a method for initiating tracking of a consistent route, according to one or more embodiments shown and described herein.

Referring to FIG. 2, an embodiment of a method 200 for storing a new route prediction in a navigation system is depicted. In particular, the method 200 provides for the identification and tracking of an infrequently-traveled route for classification in a navigation system as a frequently-traveled route for inclusion in future route predictions. In some embodiments, the method 200 may be implemented as logic within the machine readable instructions that, when executed by the one or more processors 102, automatically provide route prediction functions. It is noted that, while the method 200 depicts steps following a specific sequence, additional embodiments of the present disclosure are not limited to any particular sequence.

At step 202 of method 200, the satellite antenna 114 receives a signal from one or more global positioning satellites. In some embodiments, the satellite antenna 114 receives an electromagnetic signal with a conductive element. At step 204, the signal from the one or more positioning satellites is transformed into a data signal indicative of a current location of navigation system 100 at the time the signal is received. In one embodiment, the data signal indicative of the current location is capable of being transmitted over the communication path 104. For example, in some embodiments, the satellite antenna 114 may include a chipset that transforms the received electromagnetic signal into a data signal that is transmitted over the communication path 104 and processed by the one or more processors 102. Generally, the data signal indicative of the current location includes a latitude and a longitude. In some embodiments, the data signal indicative of the current location also includes an altitude. In some embodiments, the data signal indicative of the current location may also include a heading and/or a speed, such as when the data signal provided by the chipset includes a heading and/or speed that is associated with the latitude and longitude of the current location. In other embodiments, the data signal indicative of the current location does not include a heading or a speed. In embodiments in which the data signal indicative of the current location does not include a heading or a speed, the navigation system 100 may calculate a heading and/or speed. In some embodiments, the current location may be modified by further data. For example, the navigation system 100 may include additional sensors (e.g., gyroscopes, accelerometers, or the like) configured to detect the heading and speed of the vehicle. Accordingly, in some embodiments, the current location can be based upon a combination of data including the detected speed, detected heading, detected latitude and longitude, and processing delay.

In embodiments in which the navigation system 100 is coupled to a vehicle, the data signal includes a latitude and longitude of the vehicle such that the first location is a current location of the navigation system within the vehicle. In other embodiments, the navigation system 100 may be embedded in a mobile device (e.g., a smartphone) such that the first location is the current location of the navigation system within the mobile device.

Still referring to FIG. 2, at step 206, the machine readable instructions stored in the one or more memory modules 106, when executed by the one or more processors 102, cause the navigation system 100 to identify, automatically, one or more segment candidates from the segment list. In some embodiments, the one or more segment candidates are identified by accessing the segment list stored in the one or more memory modules 106, determining the distances between the current location and each location of each segment in the segment list, and identifying the one or more segment candidates as those segments of the segment list that have at least one location within a threshold distance from the current location. By identifying the segments having at least one location within the threshold distance from the current location, segments that may match the current location may be identified. For example, in some embodiments the threshold distance may be 60 meters, such that all segments in the segment list having at least one location within 60 meters of the current location are identified. In other embodiments, the threshold distance may differ from 60 meters, such as embodiments in which the threshold distance is 30 meters.

At step 208, the machine readable instructions stored in the one or more memory modules 106, when executed by the one or more processors 102, cause the navigation system 100 to search for one or more route candidates from the route list. In some embodiments, the one or more route candidates are identified by accessing the route list stored in the one or more memory modules 106, determining which routes of the route list include any of the one or more segment candidates identified at step 206, and identifying the one or more route candidates as those routes of the route list including at least one of the one or more segment candidates. As will be described in greater detail below, in some embodiments, steps 206 and 208 may be performed in response to determining that a turn has occurred, such that the one or more route candidates are updated to include additional route candidates that include the segment subsequent to the determined turn. At step 210, the machine readable instructions lead navigation system 100 to determine whether a route candidate from the route list includes any of the segment candidates identified at step 206 as including the current location of the vehicle to indicate whether the current location is part of a frequently-traveled route stored in the one or more memory modules 106.

At step 220, in response to navigation system 100 identifying at least one route candidate from the list including any of the segment candidates identified at step 206, thereby indicating that the current location is included in a frequently-traveled route, the machine readable instructions stored in the one or more memory modules 106, when executed by the one or more processors 102, cause the navigation system 100 to initiate a route prediction.

Alternatively, at step 212, in response to navigation system 100 not identifying at least one route candidate from the list including any of the segment candidates identified at step 206, thereby indicating that the current location is not included in a frequently-traveled route, the machine readable instructions stored in the one or more memory modules 106, when executed by the one or more processors 102, cause the navigation system 100 to prompt an inquiry of whether the current route is one that an operator of navigation system 100 desires to be classified and stored in the one or more memory modules 106 as a frequently-traveled route for future route predictions. By way of example, the prompt may be visually communicated to an operator of navigation system 100 through the display 108 of navigation system 100 such that the inquiry is displayed for an operator's review and consideration. In this instance, an operator may respond to the inquiry by selecting the desired input via the input hardware, which may include a touch screen on display 108 and/or tactile input hardware 110. In other examples, the initiated prompt at step 212 may be communicated from navigation system 100 via an audio mechanism such that the inquiry may be perceived by an operator through the vehicle's speaker system, for example. It should be understood that navigation system 100, the vehicle containing navigation system 100 and/or the mobile device that navigation system 100 may be integrated with may include a microphone such that the inquiry prompt of navigation system 100 may be responded to by means of a verbal command.

An operator of navigation system 100 may respond to the inquiry by inputting a command via the input hardware of navigation system 100. At step 214, in response to navigation system 100 receiving an input indicative of a confirmation that the current route is a frequently-traveled route, the machine readable instructions stored in the one or more memory modules 106, when executed by the one or more processors 102, cause the navigation system 100 to initiate a tracking of the current route to thereby monitor and store any segments traveled on during the new route. At step 214, navigation system 100 tracks the current route by matching the GPS coordinates of the navigation system 100 to at least one known segment from the segment list stored in the one or more memory modules 106. It should be understood that as the navigation system 100 travels along the current route, multiple segments may be traveled along such that the machine readable instructions stored in the one or more memory modules 106, when executed by the one or more processors 102, cause the navigation system 100 to track any/all of the known segments traveled on by the navigation system 100 during the current route at step 214. At step 216, upon the current route concluding, the machine readable instructions stored in the one or more memory modules 106, when executed by the one or more processors 102, cause the navigation system 100 to store and identify, automatically, the route in the one or more memory modules 106 as a frequently-traveled route.

With the newly formed route programmed into navigation system 100 as a frequently-traveled route, the machine readable instructions stored in the one or more memory modules 106, when executed by the one or more processors 102, will include this route when seeking to predict a route for navigation system 100 based on the segment list. In some embodiments, after a route is predicted, a vehicle operating parameter (e.g., a battery state of charge, a hybrid vehicle mode, a transmission gear, etc.) may be adjusted based on the predicted route. In such embodiments, a powertrain control module may be communicatively coupled to the one or more processors 102 and may adjust the vehicle operating parameter. In one embodiment in which a vehicle is a hybrid electric vehicle, the battery state of charge may be adjusted based on the predicted route or the hybrid vehicle may enter electric vehicle mode based on the predicted route. In embodiments in which a vehicle operating parameter is adjusted based on the predicted route, the vehicle operating parameter may be adjusted only when a calculated route confidence level exceeds a confidence threshold, which may avoid potential degradation in vehicle performance if an incorrect route is predicted.

Alternatively, at step 218, in response to receiving the prompt at step 210 inquiring on whether the current route is one that an operator of navigation system 100 desires to be classified as a frequently-traveled route for future route predictions, an operator of navigation system 100 may respond by inputting a command indicative of a denial. In this instance, the machine readable instructions stored in the one or more memory modules 106, when executed by the one or more processors 102, cause the navigation system 100 to dismiss the prompt on display 108. In some embodiments, once the prompt is dismissed at step 218, the list of candidate routes and/or the list of candidate segments may be updated based on a new, current location of navigation system 100, such as for example when a turn occurs and the signal received at step 202 identifies a new, current location.

In this instance, the machine readable instructions stored in the one or more memory modules 106, when executed by the one or more processors 102, cause the navigation system 100 to transform a subsequent signal received from the one or more global positioning satellites into a new, current location (step 204); reevaluate the segment candidates from the segment list that are within the threshold distance of the new, current location (step 206); and update the list of candidate routes (step 208) to re-determine whether the navigation system 100 is now located on a frequently-traveled route stored as a route candidate (step 210).

In accordance with step 212 described above, in response to navigation system 100 not identifying at least one route candidate from the updated list, thereby indicating that the new, current location is not included in a frequently-traveled route, the navigation system 100 may prompt a subsequent inquiry to determine if the new, current route is one that an operator of navigation system 100 desires to be classified and stored as a frequently-traveled route for future route predictions. Alternatively, the navigation system 100 may be configured such that a subsequent prompt is not generated again until the navigation system 100, or the vehicle containing navigation system 100 therein, is restarted. It should be understood that in some embodiments navigation system 100 may initiate the prompt of step 212 prior to the determination of step 210 such that an operator of navigation system 100 may indicate at the onset of method 200 to track the current route for future identification as a frequently-traveled route, pursuant to the method at step 214. Alternatively, in other embodiments, the machine readable instructions stored in the one or more memory modules 106, when executed by the one or more processors 102, may cause the navigation system 100 to initiate the prompt at step 212 automatically upon identifying a particular day of the week (e.g., Monday to Sunday) and/or a particular time of day (e.g. AM to PM).

Figure 3:
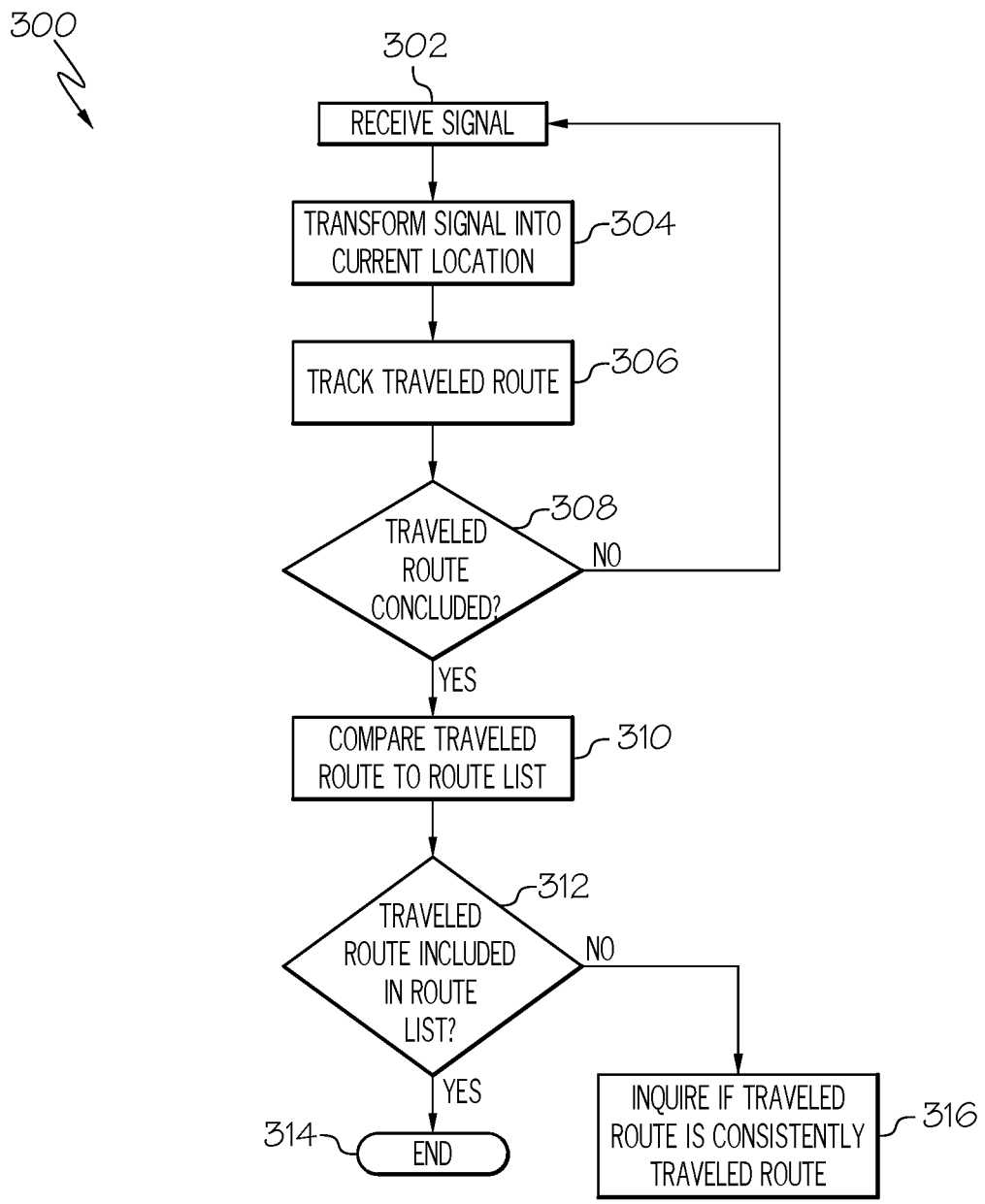
FIG. 3 schematically depicts a method for storing a new route prediction in a navigation system, according to one or more embodiments shown and described herein.

Referring to FIG. 3, another embodiment of a method 300 for storing a new route prediction in a navigation system is depicted. In particular, the method 300 provides for the identification and tracking of an infrequently-traveled route for classification in a navigation system as a frequently-traveled route for inclusion in future route predictions. Similar to method 200 described above, in some embodiments the method 300 may be implemented as logic within the machine readable instructions that, when executed by the one or more processors 102, automatically provide route prediction functions. It is noted that, while the method 300 depicts steps following a specific sequence, additional embodiments of the present disclosure are not limited to any particular sequence.

Steps 302 and 304 of method 300 are similar to steps 202 and 204 of method 200 described above, where the satellite antenna 114 receives a signal from one or more global positioning satellites and the signal is transformed into a data signal indicative of a current location of navigation system 100. At step 306, the machine readable instructions stored in the one or more memory modules 106, when executed by the one or more processors 102, cause the navigation system 100 to temporarily track the route traveled by navigation system 100, or a vehicle in some embodiments with navigation system 100 integrally secured to the vehicle. In particular, navigation system 100 may monitor and store any segments traveled on during the current route. In some embodiments, navigation system 100 may include a buffer storage in memory module 106 that is operable to store temporary tracking information (i.e. one or more segments traveled on during the current route).

At step 308, as the vehicle containing navigation system 100 travels along the current route, the machine readable instructions stored in the one or more memory modules 106, when executed by the one or more processors 102, cause the navigation system 100 to continuously verify whether the current route is still ongoing or concluded. Navigation system 100 may perform this determination at a predetermined interval-threshold by repeatedly receiving signals of the vehicle's current location for comparison to a previously-received signal for comparison purposes. At step 310, in response to navigation system 100 determining that the current route has concluded, the machine readable instructions stored in the one or more memory modules 106, when executed by the one or more processors 102, cause the navigation system 100 to compare the recently-traveled route to the plurality of known routes in the route list to determine whether the traveled route is included in the route list. In particular, the series of segments tracked and temporarily stored in the memory module 106 for the recently-traveled route may be compared to the sequence of segments associated with each known route in the route list, respectively.

At step 312, the machine readable instructions stored in the one or more memory modules 106, when executed by the one or more processors 102, cause the navigation system 100 to determine whether the recently-traveled route is to the same as at least one of the plurality of known routes from the route list. At step 314, in response to navigation system 100 determining that the recently-traveled route is included in the route list (i.e. same as at least one of the plurality of known routes stored in the route list of memory module 106), thereby indicating that the recently-traveled route is already categorized as a frequently-traveled route, the machine readable instructions stored in the one or more memory modules 106, when executed by the one or more processors 102, cause the navigation system 100 to conclude the method 300. Alternatively, at step 316, in response to navigation system 100 determining that the recently-traveled route is not included in the route list (i.e. not to the same as at least one of the plurality of known routes stored in the route list of memory module 106), thereby indicating that the recently-traveled route is not currently categorized as a frequently-traveled route, the machine readable instructions stored in the one or more memory modules 106, when executed by the one or more processors 102, cause the navigation system 100 to inquire from an operator of navigation system 100 whether the recently-traveled route should be categorized as such. In this instance, similar to method 200 described above, the inquiry may be in the form of a prompt generated by navigation system 100 for receipt and review by an operator. Accordingly, the method 300, unlike method 200 described above, provides for navigation system 100 to initiate a prompt after a current route is completed such that an operator of navigation system 100 is provided an opportunity to indicate whether the recently-traveled route is to be designated as frequently-traveled at the conclusion of the trip, rather than near the onset of the trip as described in method 200.

It should be understood that embodiments described herein provide for navigation systems and vehicles for generating new frequently-traveled routes based on a driver initiated command. The navigation systems and vehicles provided herein may seek input from a driver based on a determination that a route is not designated as a frequent route utilizing simple GPS data of the vehicle. Moreover, the navigations systems and vehicles provided herein may permit a vehicle operating parameter to be adjusted based on the predicted route, which may enhance vehicle performance and operation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A navigation system comprising:
a processor;
a satellite antenna communicatively coupled to the processor, wherein the satellite antenna receives a signal from a global positioning system satellite;
a memory module communicatively coupled to the processor;
a route list stored in the one or more memory modules; and
machine readable instructions stored in the memory module that cause the navigation system to perform at least the following when executed by the one or more processors:
receive the signal from the global positioning system satellite;
transform the signal into a current location of the navigation system;
track a travel route relative to the current location until conclusion of the travel route;
determine whether at least one route candidate from the route list includes the travel route; and
generate an inquiry to a driver for identifying the travel route as a consistent route in response to determining at least one route candidate from the route list does not include the travel route.

2. The navigation system of claim 1, wherein the machine readable instructions stored in the memory module further causes the navigation system to cease in response to receiving a denial command from the inquiry.

3. The navigation system of claim 1, wherein the machine readable instructions stored in the memory module further causes the navigation system to store the travel route in the route list in response to receiving an affirmative command from the inquiry.

4. The navigation system of claim 3, wherein the machine readable instructions stored in the memory module further causes the navigation system to detect turn movements relative to the current location.

5. The navigation system of claim 4, wherein to detect turn movements the machine readable instructions stored in the memory module causes the navigation system to calculate a difference between a first heading of the current location and a second heading of a subsequent location.

6. The navigation system of claim 4, wherein to detect turn movements the machine readable instructions stored in the memory module causes the navigation system to compare a heading of the current location relative to a predetermined threshold.

7. The navigation system of claim 4, wherein the machine readable instructions stored in the memory module further causes the navigation system to associate the detected turn movements with the travel route.

8. The navigation system of claim 3, wherein the machine readable instructions stored in the memory module further causes the navigation system to adjust a vehicle operating parameter based on the travel route.

9. The navigation system of claim 8, wherein the vehicle operating parameter is a battery state of charge.

10. The navigation system of claim 1, wherein the inquiry comprises a visual communication displayed on the navigation system.

11. The navigation system of claim 1, wherein the inquiry comprises an audio communication transmitted by the navigation system.

12. The navigation system of claim 1, wherein the machine readable instructions stored in the memory module cause the navigation system to identify one or more segment candidates from a segment list stored in the memory module, wherein the one or more segment candidates are within a threshold distance to the current location.

13. The navigation system of claim 12, wherein the machine readable instructions stored in the memory module cause the navigation system to determine whether at least one route candidate from the route list includes at least one segment candidate, and generate the inquiry to the driver for identifying the travel route in response to determining at least one route candidate from the route list does not include at least one segment candidate.

14. A method for initiating a route prediction in a navigation system for infrequently-traveled routes, the method comprising:
receiving a signal at the navigation system from a GPS satellite;
processing the signal into a current geographical location of the navigation system;

tracking an active route relative to the current geographical location such that the navigation system continues tracking the active route until conclusion of the active route;

accessing a route list stored within a memory of the navigation system upon conclusion of the active route, wherein the route list comprises a plurality of frequently-traveled routes;

determining whether the route list includes the active route; and presenting a prompt to a driver for storing the active route in the route list when the route list does not include the active route.

15. The method of claim 14, further comprising predicting the frequently-traveled route from the route list when the route list includes the active route.

16. The method of claim 14, further comprising monitoring turns by the navigation system relative to the current geographical location when tracking the active route.

17. The method of claim 14, further comprising storing the active route as a frequently-traveled route in the route list for subsequent access by the navigation system when the prompt to store the active route is affirmed.

18. A navigation system comprising:
a processor; and
a memory module communicatively coupled to the processor, wherein the memory module includes a plurality of frequently-traveled routes and logic instructions stored therein, wherein the plurality of frequently-traveled routes comprise location data, wherein the processor is operable to execute the logic instructions to:

identify a current location of the navigation system;

compare the current location to the plurality of frequently-traveled routes to determine if at least one frequently-traveled route includes location data similar to the current location;

generate an inquiry to a driver for adding a new frequently-traveled route to the memory module in response to the plurality of frequently-traveled routes not including location data similar to the current location; and record the new frequently-traveled route when the inquiry receives a positive input from the driver; or cease executing the logic instructions when the inquiry receives a negative input from the driver.

19. The navigation system of claim 18, wherein the processor is operable to execute the logic instructions to detect turn movements of the navigation system when recording the new frequently-traveled route.

20. The navigation system of claim 18, wherein the processor is operable to store the new frequently-traveled route in the memory module after recording the new frequently-traveled route.

* * * * *